United States Patent [19]
Duncum et al.

[11] Patent Number: 6,140,276
[45] Date of Patent: Oct. 31, 2000

[54] WAX DEPOSIT INHIBITORS

[75] Inventors: Simon Neil Duncum, Bracknell; Keith James, Banstead; Christopher George Osborne, Camberley, all of United Kingdom

[73] Assignee: BP Exploration Operating Company Limited, London, United Kingdom

[21] Appl. No.: 09/090,464

[22] Filed: Jun. 4, 1998

Related U.S. Application Data

[63] Continuation of application No. PCT/GB96/03194, Dec. 20, 1996.

[30] Foreign Application Priority Data

Dec. 22, 1995 [GB] United Kingdom .................. 9526325

[51] Int. Cl.[7] .............................. C09K 3/00; E21B 43/28; C10G 9/12
[52] U.S. Cl. ...................... 507/90; 208/48 AA; 585/950; 44/433; 166/304; 528/424
[58] Field of Search .............................. 507/90; 528/424; 166/304; 585/950, 860; 44/433; 208/48 AA

[56] References Cited

U.S. PATENT DOCUMENTS

| | | | |
|---|---|---|---|
| 2,792,371 | 5/1957 | Dickson | 528/424 |
| 3,277,128 | 10/1966 | Van Der Voort | 528/424 |
| 3,454,380 | 7/1969 | Dickson . | |
| 3,496,121 | 2/1970 | Shen | 528/424 |
| 3,498,932 | 3/1970 | Dishburger | 528/424 |
| 3,640,824 | 2/1972 | Bucaram | 166/304 |
| 3,694,364 | 9/1972 | Edwards . | |
| 3,766,299 | 10/1973 | Dornite | 528/424 |
| 3,884,647 | 5/1975 | Nakaguchi | 44/433 |
| 4,108,613 | 8/1978 | Frost, Jr. | 44/433 |
| 4,123,232 | 10/1978 | Frost, Jr. | 44/433 |
| 4,222,829 | 9/1980 | Popescu . | |
| 4,376,685 | 3/1983 | Watson . | |
| 4,941,991 | 7/1990 | Rajamannan . | |
| 4,975,096 | 12/1990 | Buckley, III | 44/433 |

FOREIGN PATENT DOCUMENTS

| | | |
|---|---|---|
| 0 297 451 | 1/1989 | European Pat. Off. . |
| 31 21 016 | 12/1982 | Germany . |
| 0715600 | 2/1980 | U.S.S.R. . |
| 0920061 | 4/1982 | U.S.S.R. . |
| 1488296 | 6/1989 | U.S.S.R. . |

*Primary Examiner*—Philip Tucker
*Attorney, Agent, or Firm*—Nixon & Vanderhye

[57] ABSTRACT

A method of reducing the deposition of wax from a crude oil containing wax which comprises adding thereto at least one N-substituted polyalkylene imine which has at least one organic substituent that is a hydroxy-substituted alkyl group of 12–24 carbon atoms.

8 Claims, No Drawings

WAX DEPOSIT INHIBITORS

This application is a continuation of Ser. No. PCT/GB96/03194 filed Dec. 20, 1996.

The present invention relates to wax inhibitors and processes for their preparation and use, particularly in petroleum industry pipelines.

Crude oils are complex mixtures comprising hydrocarbons of varying types and molecular weights. One class of hydrocarbon present in the oils is paraffins which are linear, branched chain or cyclic hydrocarbons having at least 18 carbons which can form waxy solids. The solubility of these waxy solid forming components in the crude oils is predominantly temperature-dependant. They are usually soluble in the crude oil under down-hole conditions ie high pressures or high temperatures. However as the oil is brought to the surface its temperature and pressure are reduced. As a result the wax may begin to precipitate out and may form deposits on any cooler surface with which it comes into contact. These wax deposits can cause problems, such as blockage of pipelines, valves and other process equipment. The wax may also deposit in pipelines used to transport crude oil or fractions derived from the total product brought up from down-hole, such as fractions comprising gas, eg natural gas, and/or water, as well as a liquid hydrocarbon body, e.g. crude (or black) oil or "condensate"; the pipelines may thus be hydrocarbon lines or multi phase transportation lines with oil, gas and/or water. The wax may deposit on surfaces of metal e.g. of ferrous metal.

We have now found certain compounds which may be used as effective wax inhibitors.

The present invention provides a novel N-substituted polyalkyleneimine compound with nitrogen atoms, which has at least one organic substituent of at least 6 carbon atoms on at least one nitrogen atom, especially a chain N atom.

In the substituted polyalkyleneimine compound each alkylene group usually has 2–4 carbons. e.g. 2, 3 or 4 especially 2 carbons. The substituted polyalkyleneimine compound or polyalkyleneimine backbone thereof may have a molecular weight of 600–1000000 e.g. 800–100000 such as 1300–3000 but may be 200,000–500,000. The polyalkyleneimine backbone may be linear or branched; the back bone usually has linear and branched sections with branching on each 1–10 nitrogen atoms e.g. 2–5 N atoms. The compound is usually oil soluble to an extent of at least 0.05% w/w in decane at 0° C., preferably at least 1% w/w; it is usually water insoluble, e.g. with a solubility in water at 25° C. of less than 1% w/w, especially less than 0.05% w/w. The compound is usually a waxy solid, e.g. of softening point 20–100° C. e.g. 40–80°.

The organic substituent may be of 6–40 carbon atoms, preferably with a continuous chain of at least 6, eg at least 12, such as 6–24 or 12–20 or 12–24 carbon atoms. The chain, and especially the organic substituent may be branched but is especially linear. The organic substituent may have such a chain bonded directly to a chain or terminal nitrogen atom of the polyalkylene imine or preferably bonded via an intermediate group usually a polar group. The intermediate group which is usually divalent, may be inorganic e.g. an ether oxygen atom or sulphonyl $SO_2$ group, or the intermediate group may be a functional group containing C and at least one O and/or N atom and optionally at least one hydrogen atom. Examples of such groups are carbonyl (—CO), including 2 hydroxycarbonyleth-1-yl-1-carbonyl (derived from a succinic acid group), a 2-hydroxy (or amino) alkylidene (1,1)-group, or 2-hydroxy (or amino) alkylene (1,2)-group (each alkylidene or alkylene having 2–4 e.g. 2 carbons) such as 2-hydroxy ethylidene $HOCH_2$—CH< or 2 hydroxyethylene —(HO)CH—$CH_2$-(or mixtures thereof) and the corresponding amino compounds (or mixtures thereof).

The organic substituent may also comprise a group A of at least 6 carbons which may be an alkyl group of 6–30, e.g. 12–24 carbon atoms, such as octyl, decyl, dodecyl/lauryl, tetradecyl, hexadecyl/palmityl, octadecyl/stearyl or may be an alkenyl group of 6–30, e.g., 12–24 carbon atoms such as octadecenyl, hexadecenyl or dodecenyl. The organic substituent may also comprise an aryl group A, e.g. an aromatic hydrocarbyl group, which may be optionally substituted by at least one ether group, e.g. alkoxy of 1–6 carbons such as methoxy or ethoxy; the aryl group may contain 6–30 carbons, such as 6–14 and especially 6–9 carbon atoms, preferably phenyl, tolyl, xylyl dodecyl-phenyl or naphthyl or methoxy phenyl. The organic substituent may also comprise a cycloalkyl group A e.g. of 5–10 carbons such as cyclopentyl or cyclohexyl, either of which may be substituted by at least one hydrocarbyl group e.g. alkyl of 1–6 carbons such as methyl, or alkoxy e.g. of 1–6 carbons such as methoxy or ethoxy. The organic substituent may also comprise an arylalkylene group A or cycloalkylalkylene group A each of 7 to 30 carbons eg 7–12 or 14–20 carbons, in which the aryl group and cycloalkyl groups may be as defined above and the alkylene group may contain 14 carbons, especially methylene and 1,2-ethylene, such as benzyl, 2-phenylethyl or cyclohexylmethyl. The organic substituent may also comprise an arylalkenylene group A, wherein aryl is as defined above and alkenylene has 2–4 carbons such as 1,2-ethylene as in 2-phenyleth-1-enyl.

The organic substituent preferably consists of said intermediate group and said group A or consists of said group A. However the organic substituent may also be a group B of formula $R^1$—C—$R^2$)—$R^3$, wherein $R^1$ comprises an optionally hydroxy or amino substituted organic group (e.g. with at least one carbon atom, particularly as defined for A above), especially with the HO or $H_2N$ group in the 2 position to the free valency such as hydroxy methyl or amino methyl and $R^2$ may be hydrogen or an organic group (e.g., as defined for A above) and $R^3$ may be hydrogen or an organic group (e.g. as defined for A above).

Examples of the above compounds of the invention are polyethyleneimines with at least one N-substituent which is a 1-alkyl or aryl 1-hydroxymethyl 1-methyl group eg 1-hexadecyl-1-hydroxymethyl 1-methyl group, 1-phenyl-1-hydroxymethyl-1-methyl group, or 2-alkyl or aryl-2 hydroxy ethyl-1-group such as 2-hexadecyl-2 hydroxy ethyl (2-hydroxy octadecyl) or 2-phenyl 2 hydroxy ethyl group, a fatty acid acyl group eg stearoyl or lauroyl, or arylacyl group eg benzoyl or arylalkylene acyl group e.g. cinnamoyl, aryl sulphonyl group e.g. benzene- or toluene sulphonyl group, 1-alkyl or aryl-1 aminomethyl-1-methyl group, or alkenyl succinyl group, e.g. fatty alkenyl succinyl group e.g. octadecenyl succinyl group.

The compounds of the invention contain at least one alkyleneimiine of the above substituents eg 0.1–1 substituent per nitrogen atom in the polyalkyleneimiine chain, especially 0.5–1 per secondary nitrogen atom in the polyalkylene imine chain, and/or per primary nitrogen atom in said chain.

The compounds of the invention may have at least one alkyleneimine unit, eg at least one repeating unit of formula —$C_nH_{2n}$—N—$(X)_a$—R where a is 0 or 1, n is 2–4, eg 2, X is an inorganic or organic intermediate group (eg as defined above) and R is an organic group, e.g. as described for A above. The compounds may contain 10–100 of such units and/or —CH$_2$CH$_2$—NH— units. The compounds may have NH$_2$ or —NH—(X)$_a$—R or HO termination groups.

The substituted polyalkylene diamines may be prepared by a process according to a further aspect of the invention which process comprises reacting a polyalkyleneimine with a compound of formula R—(X)$_a$—Y, wherein R, X and a are as defined above and Y is a nucleophilic leaving group such as a halide e.g. chloride or bromide or hydroxy group or ester thereof, e.g. a sulphonate ester, such as one of 1–10 carbons e.g., methane-, benzene-, toluene- or xylene-sulphonate ester group. Examples of compounds of formula R(X)$_a$Y are acid chlorides (or the acids themselves) from lauric, palmitic, stearic, oleic acids benzoic or cinnamic acids or sulphonyl chlorides from benzene, toluene or xylene sulphonic acids, or an acid anhydride (or acid itself) such as a substituted succinic acid e.g. octadecenyl succinic anhydride, or an alkyl halide, alkyl benzyl halide or benzyl halide especially a bromide, such as lauryl cetyl, dodecyl stearyl, benzyl bromide and dodecyl benzyl bromide. The polyalkyleneimine may be of a structure as described for the polyalkyleneimine back bone above; the polyalkylene imine usually has secondary or tertiary internal chain N atoms and usually primary terminal N atoms, the ratio of primary to secondary to tertiary N atoms is usually 0.5–2:14:0.5–2 e.g. about 1:2:1. The reaction may be performed with heating usually at 30–250° C. such as 100–200° C. and may be in the presence of a base eg an acid acceptor (for HY); examples are particulate inorganic hydroxides and carbonates, such as calcium carbonate and organic tertiary bases such as NN dimethylaniline. When the Y group is OH, the reaction may be performed with continuous removal of by product water eg azeotroping in a Dean and Stark apparatus, or by evaporation under vacuum; the latter may also be used when Y is a halide. The reaction may be performed with a molar ratio of R(X)$_a$—Y compound equivalent of to NH group in the polyalkyleneimine of 0.1–10:1. The reaction may be performed in the presence of an inert solvent or diluent eg hydrocarbon solvent such as xylene or cyclohexane. The reaction may be continued until substantially all the secondary and/or primary NH groups have been reacted.

In another aspect of the present invention, the process comprises reacting a polyalkyleneimine with an epoxide or a mixture of at least two epoxides, or an imine e.g. with a terminal epoxy or imine group. Examples of such epoxides or imines are those which are R substituted ethylene oxides or ethylene imines such as 1,2-epoxy octadecane, 1,2-epoxy eicosane and 1,2-epoxy docosane and mixtures thereof. The epoxide or imine may also have an internal epoxy or imine group as in epoxidised internal alkadienes or alkenes, eg octadiene or epoxidised ricinoleic acid. Apart from use of the epoxide or imine the reaction conditions, proportions etc may be as described above. The products are ones in which the organic substituent is bonded to the polyethylene imine by an intermediate group, which is a hydroxy (or amino) alkylene or alkylidene group (or a mixture thereof).

The acyl substituted polyethylene imines which are predominantly linear may also be made by cadionic polymerisation of 2-alkyl oxazolines, while other N-organo substituted polyethylene imines may be made by cationic polymerisation of the corresponding N-substituted aziridines.

At the end of the reactions of the invention, the products may be used as such or after working up, e.g. by filtration or extraction of any products from the acid acceptor, and optionally evaporation of any solvent or diluent.

The invention also provides the substituted polyalkylene imines obtainable by or obtained by the processes of the present invention.

The substituted polyalkylene imines are used as such or in solution in a hydrocarbon solvent, such as decane or xylene, eg as 0.5–10% w/w solutions. They may be used to lower the wax appearance temperature (WAT) of wax in a condensed state hydrocarbon e.g. solid or liquid hydrocarbon. The hydrocarbon is usually primarily aliphatic in nature, but may contain up to 50% w/w liquid aromatic compounds. The hydrocarbon may be a crude or black oil or a distillate or non volatile fraction therefrom, such as a vacuum or thermal residue. Preferably the hydrocarbon is an oil field product, eg either a whole well product, the multiphase mixture in or from the well bore, or one at the well head after at least partial separation of gas and/or water, and may be flowing up a well bore, or on a production platform or between platforms or from a platform to a collection or storage facility eg from offshore to onshore. Particularly of interest are hydrocarbons moved in pipelines under the sea under low temperature conditions eg in latitudes of greater than 50° N or S or in Gulf of Mexico. The hydrocarbon may contain up to 50% by weight of wax e.g. 0.5–50% usually 0.5–30% or 1–15% especially 2–9%. The hydrocarbons may contain dissolved gas (eg with amounts of up to 10% gas) or water or water droplets eg with 5–40% water (e.g. as in water in oil emulsions, so called "chocolate mousse"). There may also be gas and/or water as a physically separate phase. The hydrocarbons may in the absence of the compounds of the invention, have a WAT value of at least 0° C. e.g. 0–50° C. such as 25–50° C.; pour point of such hydrocarbons may be 10–30° C. e.g. 20° C. lower than the WAT value. The compounds of the invention may reduce the WAT value of the liquid hydrocarbon by at least 5° C. e.g. 5–20° C. such as 10–15° C., but may be 0.5–5° C.

The compounds may delay the onset of wax nucleation e.g. as shown by light scattering and/or the rate of wax deposition per unit time. In addition they may also reduce the pour point and/or modify the wax crystals or disperse the wax. Amounts of 100–10,000 ppm eg 200–5000 ppm especially 400–2,000 ppm (usually based on the weight of the hydrocarbon) of the compounds of the invention may be added to the hydrocarbon containing wax.

Thus the present invention also provides a method of lowering the wax appearance temperature of a hydrocarbon containing a wax, which comprises adding thereto at least one substituted polyalkylene mine of the invention or one obtained by or obtainable by the process of the invention.

There is also provided a method of reducing the deposition of wax from a hydrocarbon containing wax, which comprises adding thereto at least one substituted polyalkylene imine of the invention or obtainable by or obtained by the process of the invention.

The compounds of the invention may be added in a portion to the hydrocarbon to be protected or may be mixed batchwise, continually or continuously with a moving usually liquid body of that hydrocarbon, preferably added to a line containing flowing liquid hydrocarbon to be protected, upstream of a cooler location where wax deposition may occur in the absence of said compound.

The invention is illustrated in the following Examples:

EXAMPLE 1

A polyethyleneimine of molecular weight 1800 (obtained from Polysciences Limited and believed to have a linear and branched structure) (4.3 g) was heated with stirring under nitrogen with 1,2-epoxyoctadecane (26.8 g about an equivalent of epoxy per N atom in the polyalkylene imine) for 16 hrs at 180° C. The reaction product was allowed to cool.

The product accorded with a structure formed from addition of an NH group in the polyethyleneimine to the epoxy ring.

EXAMPLES 2–4

In these Examples, the effectiveness of the product of Ex. 1 in affecting wax formation or deposition was compared to a blank with no additive. The tests were performed on 2 wax test solutions C and D of the following weight composition.

Wax Solution C

5% crystals of wax (Ref. 58/60 refinery fraction), 5% toluene and 90% decane fraction.

Wax Solution D

10% crystals of above wax, 5% toluene and 85% decane fraction.

Wax Solution E

10% crystals of wax (Ref: 150/155 refinery fraction), 5% toluene and 85% decane fraction.

In each case the inhibitor solutions were made up in 1% w/w solution in decane, and appropriate amounts added to provide concentrations of 400 ppm or 1000 ppm in the test solution with the wax.

EXAMPLE 2

In this Example the property of affecting wax nucleation was tested, by determination of the first appearance of crystals in the test solution (with wax) by light scattering. Into the test solution in a vial maintained in a constant temperature enclosure at 18° C. or 20° C. was passed monochromatographic light and the amounts of light transmitted through the vial and that scattered at 90° thereto were detected on solid state detectors and the information fed to a computer and the time of first appearance of wax crystals noted. Each vial contained 20 g of the wax solution C or D, together if required with appropriate amount of additive (in decane); after mixing the components at 50° C., the solutions were stored at 50° C. ready for use.

The results were as follows:

| Test Solution | Additive | Temperature ° C. | Amount ppm | Time to Nucleation (Mins) |
|---|---|---|---|---|
| C | None | 18 | — | 108 (Average) |
| C | Ex. 1 | 18 | 400 | 1440 (stopped) |
| D | None | 20 | — | 42 |
| D | Ex. 1 | 20 | 400 | 50 |

"Stopped" means that the test was stopped even though no crystals had formed.

In an alternative test the lowest temperature at which a solution will not show nucleation for 6 hours was determined. For solution C and no additive, the lowest temperture was 18.5° C., while for solution C with 400 ppm of the product of Ex. 1 it was 15.8° C.

EXAMPLE 3

This example describes tests on the rate of build up of wax deposits in a pipeline as evidenced by the temperature at which blockage occurs. The apparatus comprised a stainless steel coil of 1.88 mm internal diameter tube 3.2 m long which was maintained in a constant temperature bath and the solution at 55° C. containing wax to be tested was passed through this coil at 5 ml/min. giving a 2 minute retention time. Initially the bath was at 40° C. and then the temperature of the bath was reduced to 10° C., well below the temperature at which wax would deposit and block the tube in the absence of inhibitor. The liquid exiting the coil was recycled to a heating bath at 55° C. to melt any wax crystals in it and then returned to the cold coil. In this way the only solid involved in the experiment is that deposited in the coil. The pressure difference across the coil was monitored to determine the build up of deposit and the temperature for complete blockage noted; this was deemed to occur when the pressure difference across the coil was greater than 86.2 KPa (125 psi). For test solution C this was about 25° C. and for test solution D it was about 26.5° C. The experiments were repeated with the test solutions also containing the compounds for testing. The results were as follows:

For test solution D, with the product of Ex. 1 at 400 and 1000 ppm, blockage occurred at 26° C., while with test solution C, with the product of Ex. 1 at 400 and 1000 ppm, blockage occurred at 23.2° C. and 19.4° C. respectively.

EXAMPLE 3a

The process of Ex.3 was performed in a similar fashion but the initial bath temperature was 20° C. and the solution containing wax circulated for 18 hours. Subsequently the bath temperature was dropped by a small interval and the process repeated one or more times until complete blockage occurred.

The results were as follows, for test solution C, with no additive blockage occurred at 17.1° C. For test solution C with the product of Ex. 1 at 400 and 800 ppm, blockage occurred at 12.9° C. and 13.2° C. respectively. For a commercially available wax inhibitor at 800 ppm, blockage occurred at 15.1° C.

EXAMPLE 4

The wax appearance temperature was determined from the highest temperature at which wax crystals deposited from solution. Each solution for testing was loaded into a flat cross section microscope capillary tube, which was then sealed. The tube was mounted on a thermostated stage of a microscope whose temperature was then reduced at 0.1° C./min and the solution inspected. The temperature of appearance of wax was noted. The absolute results here are different from those in Ex. 2 because in this case the sample is cooled in a preprogrammed way, while in Ex. 2 the sample is held at a constant temperature.

With solution C, and no additive the WAT was 17.6° C. while with 400 ppm of product of Ex. 1, the WAT was 16.8° C., while with solution D and no additive the WAT was 24.3° C. and with 400 ppm of the product of Ex. 1 was 22.49° C.

With solution E, and no additive the WAT was 34.9° C., while with 400 ppm of product of Ex. 1, the WAT was 34.2° C.

EXAMPLE 5

The process of Example 1 was repeated except that an epoxidised $C_{20}/C_{22}$ α-olefin was used instead of 1,2-epoxyoctadecane. The epoxidised $C_{20}/C_{22}$ α-olefin was prepared as follows.

30g crude (~80%) m-chloroperbenzoic acid was washed with 300 ml of a phosphate buffer solution (pH7.8) to obtain a fine suspension. The suspension was filtered, the separated solid dissolved in dichloromethane and the resulting solution dried.

Mixed $C_{20}/C_{22}$ α-olefin (25 g) (containing 66% eicosane and 22% docosane) was dissolved in 200 ml dichloromethane and 400 ml of a phosphate buffer solution (pH7.8) added at room temperature. The mixture was stirred and the m-chloroperbenzoic acid solution added in 50 ml portions over a period of 2 hours with the stirring continuing overnight to produce an organic phase and an aqueous phase. The organic phase was separated, dried and the solvent removed under vacuum to leave a residue. The residue was redissolved in dichloromethane (200 ml) and washed with further phosphate buffer solution (3×50 ml), separated, dried and evaporated. This purification stage was repeated a further time using 1M sodium carbonate solution and the product worked up as above to leave a product, the NMR of which accorded the structure of a product of a mixture of 1,2-epoxyeicosane and 1,2epoxydocosane of 87.7% purity with 35% m-chlorobenzoic acid.

The process of Example 1 was repeated using the above produced epoxidised $C_{20}/C_{22}$ α-olefin instead of epoxyoctadecane.

The product obtained had a structure whose nmr spectrum accorded with a structure from addition of at least one NH group in the polyethyleneimine to the epoxy rings.

EXAMPLE 6

The wax appearance temperature for solution D with 400 ppm of the product of Ex. 5 and solution D with no additive, were determined according to the method of Example 4. The results were as follows: for solution D with no additive, the WAT was 24.3° C., and with 400 ppm of the product of Ex. 5 it was 22.1° C.

EXAMPLE 7

The process of Example 3a was repeated. For test solution C with the product of Ex. 5 at 400 and 800 ppm, blockage occurred at 14.4 and 14.38° C. respectively.

We claim:

1. A method of lowering the wax appearance temperature of a crude oil containing wax which comprises adding thereto at least one N-substituted polyalkylene imine which has at least one organic substituent that is an hydroxy-substituted alkyl group of 12–carbon atoms which is bonded to a chain or terminal N atom of the polyalkylene imine either directly, or via an ether oxygen or an $SO_2$ intermediate group.

2. A method of reducing the deposition of wax from a crude oil containing wax which comprises adding thereto at least one N-substituted polyalkylene imine which has at least one organic substituent that is an hydroxy-substituted alkyl group of 12–24 carbon atoms which is bonded to a chain or terminal N atom of the polyalkylene imine either directly, or via an ether oxygen or $SO_2$ intermediate group.

3. A method as claimed in claim 2 in which the crude oil contains 0.5% to 50% by weight of wax.

4. A method as claimed in claim 2 in which the crude oil contains dissolved gas or water or water droplets.

5. A method as claimed in claim 2 in which the N-substituted polyalkyleneimine is added to the hydrocarbon in an amount of 400–2000 ppm.

6. A method as claimed in claim 2 wherein the N-substituted polyalyleneimine is 2-hydroxyoctadecylated polyalkyleneimine.

7. A method as claimed in claim 1 wherein the N-substituted polyalkylene imine has a polyalkylene imine backbone of the molecular weight of 600 to 1,000,000.

8. A method as claimed in claim 2 wherein the N-substituted polyalkylene imine has a polyalkylene imine backbone of a molecular weight of 600 to 1,000,000.

* * * * *

UNITED STATES PATENT AND TRADEMARK OFFICE
CERTIFICATE OF CORRECTION

PATENT NO.   : 6,140,276                                       Page 1 of 1
DATED        : October 31, 2000
INVENTOR(S)  : Dumcum et al.

It is certified that error appears in the above-identified patent and that said Letters Patent is hereby corrected as shown below:

<u>Column 8,</u>
Line 3, please delete "12-carbon atoms" and replace with -- 12-24 carbon atoms --.

Signed and Sealed this

Fifth Day of August, 2003

JAMES E. ROGAN
*Director of the United States Patent and Trademark Office*